United States Patent [19]

Andreassen et al.

[11] 4,432,859

[45] Feb. 21, 1984

[54] DIAPHRAGM FOR WATER ELECTROLYSIS

[76] Inventors: Knut A. Andreassen, Rådyrv. 77, 3900 Porsgrunn; Olav A. Eide, Villavn. 30, 3660 Rjukan, both of Norway; Gerhard Beyer, c/o Hoechst Aktiengesellschaft, Postfach 80 03 20, 6320 Frankfurt Am Main 80, Fed. Rep. of Germany

[21] Appl. No.: 371,485

[22] Filed: Apr. 23, 1982

[30] Foreign Application Priority Data

Jun. 16, 1981 [NO] Norway .................................. 812027

[51] Int. Cl.$^3$ .......................... C25B 1/46; C25B 13/08
[52] U.S. Cl. ..................................... 204/296; 204/129
[58] Field of Search ......................................... 204/296

[56] References Cited

U.S. PATENT DOCUMENTS

| | | | |
|---|---|---|---|
| 4,164,463 | 8/1979 | Fang | 204/296 |
| 4,219,520 | 8/1980 | Kline | 264/129 |
| 4,238,303 | 12/1980 | Fang | 204/296 |
| 4,337,141 | 6/1982 | Watanaba | 204/296 |

FOREIGN PATENT DOCUMENTS

41333 12/1981 European Pat. Off. .

*Primary Examiner*—John F. Niebling
*Attorney, Agent, or Firm*—Wenderoth, Lind & Ponack

[57] ABSTRACT

The present invention relates to a new type of diaphragm for use in electrolytic cells for the production of hydrogen and oxygen, which diaphragm consists essentially of fluorocarbon polymers which have been oxidized to improve its wettability. According to the present invention the improved diaphragm is characterized in that the fluorocarbon polymers are present in the form of monofilaments, that only the surface of the monofilaments is oxidized, and that the monofilaments are woven into a fabric. In a preferred embodiment the monofilaments have a diameter of less than 0.25 mm in the weft and less than 0.15 mm in the warp. The permeability of gas in the dry state is from 50 to 1000 $l.dm^{-2}.min^{-1}$ when the difference in pressure is 200 Pa. Preferably the monofilaments are evenly spaced to effect even size of the pores between the monofilaments.

3 Claims, No Drawings

DIAPHRAGM FOR WATER ELECTROLYSIS

The present invention relates to a new type of diaphragm for use in electrolytic cells for the production of hydrogen and oxygen, which diaphragm consists essentially of fluorocarbon polymers which have been oxidized to improve the wettability of the diaphragm.

At present, in commercial cells of this type, asbestos diaphragms are used. The diaphragms are in the form of woven fabrics made from asbestos threads, which may be spun around a nickel reinforcing core. Such diaphragms have been used in commercial plants for a number of years.

With the construction of improved cells working at higher temperatures and pressures, the chemical deterioration of asbestos will increase, giving a reduction of working life of the diaphragm and contamination of the electrolyte. The individual yarns may break and the fabric split. Loose fiber ends may also cause trouble. These diaphragms normally also have relatively high electrical resistance and in addition there are serious health problems associated with the handling of asbestos materials.

It is therefore highly desirable to find an alternative and more resistant diaphragm material. There have already been a number of proposals of new materials and methods for making the diaphragms, such as the use of synthetic polymers. Of the synthetic polymer materials proposed it seems that only fluorocarbons have the necessary chemical resistance. Unfortunately they do not perform satisfactorily in diaphragms, giving high cell voltage and poor gas separation resulting in high gas impurities.

The reason for this has been attributed to the hydrophobic nature of the polymers, as it appears that high chemical resistance and hydrophobic properties have to be considered as related phenomena.

The latest developments in this field have therefore been directed towards new methods for eliminating the hydrophobic character of the polymer material. This may be done either by applying a special hydrophilic coating on the fiber surface or by substituting certain chemical groups, i.e. a chemical modification of the fibre itself. A comprehensive survey of the state of the art concerning such treatment and modification of the fluorocarbon polymers is given in DE AS 2,717,512 and U.S. Pat. No. 4,164,463. To improve the wettability, i.e. the hydrophilic properties of fluorocarbon polymers or of films or tubes made thereof, it is also known to apply a strong oxidizing treatment. Such processes are described in U.S. Pat. No. 4,219,520 and DE OS 2,818,128.

The main object for these efforts has been to develop diaphragms for the chlorine/alkali electrolysis. So far no successful commercial products are available for use in the field of water electrolysis.

We have tested a number of woven fabrics made from tetrafluorethylene (TFE) polymer and copolymer yarn and generally found that the gas purity was too low and the electrical voltage too high, and that conventional diaphragm structures made from these materials were totally unsuitable for water electrolysis.

It is generally assumed that a diaphragm should have a very high number of pores or perforations with equal diameter, all filled with electrolyte. Furthermore, using the smallest possible pores should give the highest gas purity. This is very important, because in water electrolysis the requirements regarding gas purity are very strict to avoid recombination of $H_2$ and $O_2$ within the cells, which is considered highly hazardous.

The permeability for ions and the electric voltage should not be impaired by small pores, as this will depend on the ratio between pores and solid material, but complete wetting of the fibrous material is considered to be essential. To achieve this and to fill all the pores completely with liquid electrolyte the diaphragm material must be strongly hydrophilic.

According to the present state of the art, the diaphragms for water electrolysis should therefore be made from fibrous yarns, and made into a felt-like structure with minute pore sizes, and the permeability of the dry fabric measured by standard methods should be in the range of 0.5—10 $l. dm^{-2}. min^{-1}$ by a pressure drop of 200 Pa (20 mm water column).

A strongly hydrophobic material will repel water droplets which are approaching the pores in the diaphragm, creating gas layers on both sides of the diaphragm, and this explains why a conventional diaphragm made from fluorocarbon polymer will give low gas purity as well as high ohmic resistance.

According to the present invention there is provided a new and improved diaphragm. It is characterized in that the fluorocarbon polymers are present in the form of monofilaments, that only the surface of the monofilaments is oxidized, and that the monofilaments are woven into a fabric. In a preferred embodiment of the invention the monofilaments have a diameter of less than 0.25 mm in the weft and less than 0.15 mm in the warp. The permeability of gas in the dry state is from 50 to 1000 $l. dm^{-2}. min^{-1}$ when the difference in pressure is 200 Pa. Preferably the monofilaments are evenly spaced to effect even size of the pores between the monofilaments.

A more detailed description of the invention is given below, together with an illustrative example.

According to the invention an effort was made to determine if the hydrophobic nature and non-wettability of the material to some extent might be remedied by using more open diaphragm structures. A set of diaphragm fabrics having far higher permeabilities than usual, i.e. in the range 50 to 1000 $l. dm^{-2}. min^{-1}$, were produced, and these fabrics were tested in hydrogen production plants. The results are quoted in Table 1.

TABLE 1

| | Preliminary tests | | |
|---|---|---|---|
| FABRIC | Permeability $dm^{-2} min^{-1}$* | Resistance $\mu\Omega m^{-2}$** | Gas Purity % |
| Multifil | 70 | 700 | 70–90 |
| Multifil | 160 | 150 | 80–97 |
| Multifil | 300 | 120 | 90–98 |
| Multifil | 700 | 80 | 95–99 |
| Monofil | 300 | 150 | 99.5–99.9 |

*at 200 Pa
**in 25% KOH solution at 80° C.

These initial tests of diaphragms made from tetrafluoroethylene polymer and copolymer material indicated that with more open fabric structures some improvement was obtained.

Most surprisingly it was found that a fabric made from monofilaments having a diameter of less than 0.25 mm in the weft and less than 0.15 mm in the warp, gave the greatest improvement. Thus it seemed that the use of monofilament threads together with a more open fabric structure will make it easier for water to penetrate into the individual pores of the diaphragm, thereby reducing the gas layers on both sides of the diaphragm, markedly improving the gas purity and to some extent also reducing the cell resistance. Sufficient improvement is not obtained, however, and this may be explained by the fact that the monofilament surface is still highly hydrophobic and will not be moistened or wetted by electrolyte.

are use of $K_2Cr_2O_7$+conc. $H_2SO_4$ solution by wet treatment, and electric sparks, i.e. so called corona discharge, by dry treatment. The time of treatment as well as the temperature etc. were varied to determine the optimal conditions.

The results of these tests are given in Table 2 below.

TABLE 2

| | Fabric Construction | Surface Treatment | Permeability $1 \cdot dm^{-2} \cdot min^{-1}$ | Gas Purity % | Resistance $\mu\Omega m^{-2}$ | Result |
|---|---|---|---|---|---|---|
| 1 | Polytetrafluoroethylene (PTFE) Multifil | untreated | 120 | 75–95 | 300 | failure |
| 2 | PTFE Multifil | wet oxidized | 120 | 75–95 | 300 | failure |
| 3 | Polyethylenetetrafluoroethylene (EFTE) Monofil | untreated | 300 | 99.5–99.9 | 150 | failure |
| 4 | EFTE Monofil 75/13–0.15/0.25* | dry oxidized | 300 | 99.6–99.9 | 90 | acceptable |
| 5 | EFTE Monofil 75/13–0.15/0.25 | wet oxidized | 300 | 99.6–99.9 | 64 | good |
| 5b | EFTE Monofil 75/17–0.15/0.20 | " | 420 | 99.5–99.9 | 60 | good |
| 5c | EFTE Monofil 75/20–0.15/0.15 | " | 250 | 99.7–99.9 | 62 | good |
| 5d | EFTE Monofil 75/24–0.15/0.15 | " | 400 | 99.5–99.8 | 55 | good |
| 5e | EFTE Monofil 94/22–0.12/0.15 calendered | " | 300 | 99.6–99.9 | 45 | good |
| 5f | EFTE Monofil not calendered | " | 650 | 99.2–99.8 | 42 | good |

*The number of threads/cm, and the filament diameter in mm, in the war pand, weft direction respectively According to the invention it was then assumed that if only a slight modification of the hydrophobic nature of the material could be obtained, this, working in combination with the specific monofilament threads and open structure of the fabric, could solve the problem.

Consequently, it was decided to modify or attack the surface of the monofilaments with a strong oxidizing treatment. Even if such treatment will not change the chemical properties of the material, the attack on the surface was assumed to modify it sufficiently to increase the wettability.

Appropriate fluorocarbon polymers are polyethylenetetrafluoroethylene, i.e. copolymers of ethylene and tetrafluoroethylene optionally containing up to 10 mol-% of at least one other monomer containing fluorine; copolymers of vinylacetate and tetrafluoroethylene and terpolymers of vinylacetate, ethylene and tetrafluoroethylene.

A series of practical tests were carried out as shown below.

EXAMPLE

A number of diaphragm fabrics were made. The number of threads in the warp and weft direction, the diameter of the threads and the fabric structure were varied. Among possible strong oxidizing treatments, two methods were selected. One wet treatment by high chemical oxidation potential, and a dry treatment by high energetic radiation. Examples of the two different methods The tests results show that the combination of high permeability, use of monofilament threads and a strong oxidizing treatment is necessary to obtain diaphragms which perform satisfactory. Such diaphragms have been subjected to lengthy tests in commercial hydrogen plants and perform well also after service for a long time.

While the above three factors are essential, it seems that the fabric construction is not so critical as long as the filament diameter is within the claimed range. The number of threads/cm and the weaving pattern may be varied within relatively wide limits, provided the requirements regarding permeability, which should be in the range of 50 to 1000 $l/cm^2$ .min, are fulfilled.

The fabrics used in the examples are woven in a simple plain weave pattern with one and one thread interlaced. The threads used were polytetrafluoroethylene multifilaments and Hostaflon ET ® monofilaments and the diameter of the warp threads is 0.15 mm, while the diameter of the weft threads is 0.25 mm. The number of threads per cm is 75 in the warp direction and 13 in the weft direction. After weaving the fabric is hot calendered to prevent shrinkage, adjust the permeability and increase the stability.

The preferred fluorocarbon polymer used is thus Hostaflon ET ® monofil, an ethylene tetrafluoroethylene copolymer. For a polytetrafluoroethylene polymer it is extremely difficult to give a modified surface texture with a strong oxidizing treatment, but the invention does not exclude the possibility of using such materials.

According to the invention we have eliminated the need for using asbestos as a diaphragm material has been eliminated by providing a fluorocarbon diaphragm giving satisfactory gas purity and cell resistance. The monofilament threads are stronger than asbestos threads and are not susceptible to fatigue breaks. The chemical resistance is also high and the life expectancy therefore long. The diaphragm can be made from thinner and lighter fabric, which is of great advantage for mounting and installing the diaphragm in the electrolysis cells.

We claim:

1. A diaphragm suitable for use in a water electrolysis cell, which consists essentially of a woven fabric of monofilaments of a fluorocarbon polymer, only the surface of said monofilaments being oxidized, the permeability of said diaphragm for gas in a dry state being from 50 to 1000 $l.dm^{-2}.min^{-1}$ at a pressure difference of 200 Pa.

2. A diaphragm according to claim 1, wherein the monofilaments have a diameter of less than 0.25 mm in the weft and less than 0.15 mm in the warp.

3. A diaphragm according to claim 1, wherein the monofilaments are evenly spaced to effect even size of the pores between the monofilaments.

* * * * *